United States Patent
Pennebaker, Jr.

[11] 3,898,610
[45] Aug. 5, 1975

[54] METHOD FOR PREDICTION OF ABNORMAL PRESSURES FROM ROUTINE OR SPECIAL SEISMIC RECORDS

[75] Inventor: Eugene S. Pennebaker, Jr., 902 Barracuda, Corpus Christi, Tex. 78411

[73] Assignee: Exxon Production Research Company, Houston, Tex.

[22] Filed: Sept. 22, 1969

[21] Appl. No.: 860,108

Related U.S. Application Data

[63] Continuation of Ser. No. 643,091, June 2, 1967, abandoned.

[52] U.S. Cl. .................... 340/15.5 CP; 340/15.5 SS
[51] Int. Cl. ............................................. G01r 1/28
[58] Field of Search .......................... 340/15.5 AD, 15.5 SS, 15.5 CP

[56] References Cited
UNITED STATES PATENTS

3,235,026   2/1966   Hottman ................................ 181/.5

OTHER PUBLICATIONS

Green, *Velocity Determinations by Means of Reflection Profiles*, Geophysics, Vol. III, No. 4, Oct. 1938, pp. 295–305.

*Primary Examiner*—Maynard R. Wilbur
*Assistant Examiner*—H. A. Birmiel
*Attorney, Agent, or Firm*—John S. Schneider

[57] ABSTRACT

A technique for determining depth of highly pressurized formations wherein a seismic observation is performed to produce a multitrace seismogram, reflection events thereon are identified, the average velocities and the interval velocities are determined from reflection events on the seismogram, and deviation from a "normal" velocity function is used to determine depth and degree of abnormality of high pressure formations. Specific gravity of earth cuttings is measured while drilling a borehole, and deviations from the normal are used to further locate such formations.

12 Claims, 5 Drawing Figures

PATENTED AUG 5 1975    3,898,610
SHEET 1
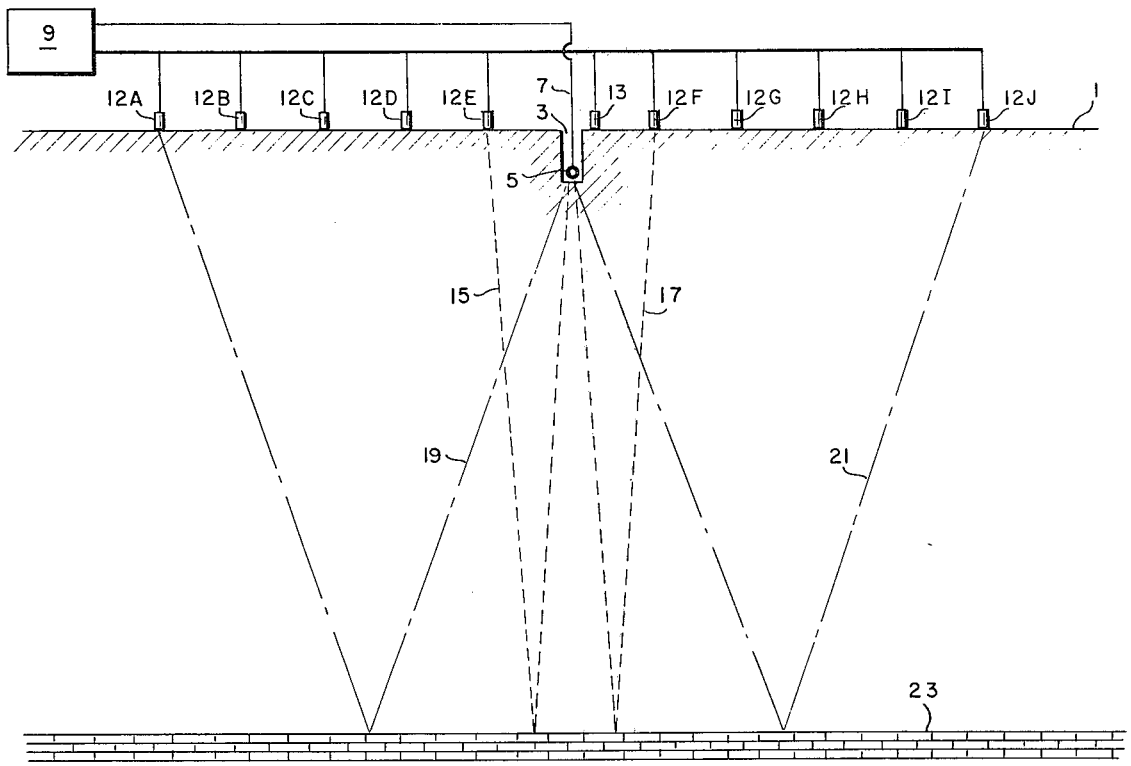
Fig. 1.
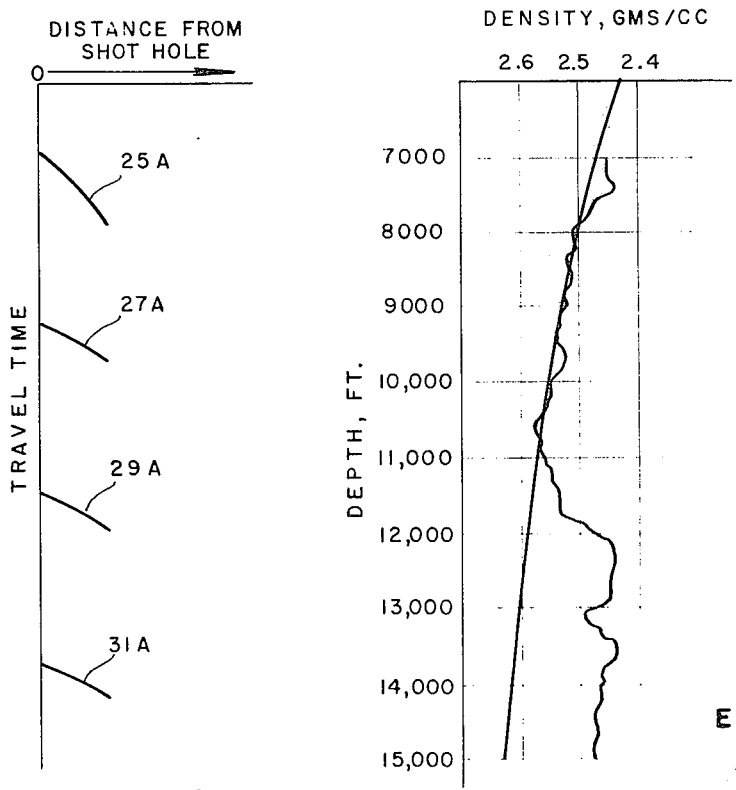
Fig. 5.
Fig. 2.
INVENTOR.
EUGENE S. PENNEBAKER, JR.
BY John B Davidson
ATTORNEY.

INVENTOR.
EUGENE S. PENNEBAKER, JR.

3,898,610

METHOD FOR PREDICTION OF ABNORMAL PRESSURES FROM ROUTINE OR SPECIAL SEISMIC RECORDS

This application is a streamlined continuation of application Ser. No. 643,091, filed June 2, 1967, now abandoned.

BACKGROUND OF THE INVENTION

This invention relates generally to the determination of the depth of formations in the earth having abnormally high pressure conditions therein, and more particularly to a technique for predicting the pressures in such formations prior to the drilling of a borehole penetrating the formation.

In the process of forming rocks known as sedimentation, older sediments are buried deeper and deeper, with the weight of the overburden causing compaction. During compaction, the entrapped fluids are subjected to pressures in the earth's formations which usually increase gradually with depth. Drilling fluids, usually referred to as "muds," are circulated in the bored hole to cool and lubricate the drill bit, flush the cuttings from the bottom of the hole and carry them to the surface, and to balance the formation pressures encountered by the borehole. It is desirable to keep rotary drilling mud weights as light as possible to most economically penetrate the earth and to prevent heavier muds from "breaking down" the rocks penetrated by the borehole, thereby causing loss of circulation. The mud weight is carefully monitored and is increased during drilling operations to compensate for this increase in formation pressure. In some areas, however, there may be unexpected abnormal increases in formation pressure such that the mud weight by itself cannot control the pressure, resulting in a blowout. The reason that such abnormal pressure conditions occur is that the fluids become trapped in the rock for some reason so that the fluids support some of the weight of the overburden. Also, there may be an earth formation of high porosity and high permeability, or a series of such formations, within a massive shale formation that is relatively impermeable so that fluid pressure is transmitted into such highly permeable formations (which usually are sands) as the weight of the overburden increases during sediment deposition on the earth. When such formations are penetrated, the large pressure gradient into the borehole can easily result in a blowout.

It is desirable to set casing shortly below the top of such a formation and then to increase the mud weight for pressure control during further drilling through the formation. Setting pipe through the normal or low pressure formations permits the use of very heavy drilling muds without the danger of breaking down the walls of the borehole so as to result in lost returns. On the other hand, should the substitution of heavy drilling mud be delayed until the drill bit has penetrated to an excessive depth within the overpressurized formation, it may be impossible to remove the drill string without producing a blowout and losing the well.

In areas where there is reason to suspect the existence of such high pressure formations, various techniques have been followed in attempts to locate such zones. For example, acoustic or electric logs have been run repeatedly after short intervals of borehole have been drilled, and a plot of acoustic velocity or electrical resistance or conductivity as a function of depth has been made. Abnormal variations of acoustic velocity and/or electrical properties obtained by logging may indicate that the drilling operation is in a zone of increasing formation pressure. It is manifest that such techniques are very expensive and time-consuming and cannot predict what pressures will be encountered ahead of the bit.

SUMMARY OF THE INVENTION

In accordance with one aspect of the present invention, a seismic observation is performed in an area where a well is to be drilled to obtain a seismogram having a plurality of traces, each indicative of seismic travel times between one seismic terminus location and each of a plurality of seismic terminus locations spaced at various distances from the first seismic wave terminus location. Events produced by reflected seismic waves are then identified on the seismogram, and the average velocity of the reflected seismic waves producing each lineup of events on the seismogram is measured. There is then produced a record of each velocity thus measured as the function of estimated depth of the reflecting horizons corresponding thereto to permit determination of any deviation from a putatively normal seismic wave velocity variation as a function of depth in the earth. The putatively normal seismic wave velocity variation may be performed by measuring the velocity of seismic waves as a function of depth in at least one borehole in the general area of the location of the seismic observation, which borehole penetrates normally pressurized formations throughout its length. Alternatively, the putatively normal seismic wave velocity may be obtained from the expression $$\mathrm{Log}_{10} V = \mathrm{Log}_{10} V_o + KD$$

where
 $V_o$ is seismic wave velocity at datum depth,
 $K$ is a constant in the range 0.000027 to 0.000031 (preferably 0.000029)
 $D$ is depth in the earth.
Datum depth is a reference elevation, such as sea level, to which all wells are corrected.

In accordance with a further aspect of the invention, during the drilling of the borehole the density of earth cuttings brought to the earth's surface is measured from time to time. Further drilling is discontinued upon an abnormal decrease in density of the earth cuttings to permit setting of casing and to permit an increase in drilling mud weight prior to further drilling to greater depths.

Objects and features of the invention not apparent from the above discussion will become evident upon consideration of the following detailed description of the invention when taken in connection with the accompanying drawings.

BRIEF DESCRIPTION OF THE DRAWINGS

In the drawings:

FIG. 1 is an elemental schematic diagram of apparatus for performing a seismic observation at a location on the earth's surface in accordance with the invention;

FIG. 2 is a simplified elemental diagram of a seismogram;

FIG. 5 is a plot of earth cutting density in grams per cubic centimeter as a function of depth that would be obtained by drilling a borehole through an overpressured formation, which plot is useful in explaining another aspect of the invention.

DESCRIPTION OF THE PREFERRED EMBODIMENTS

Figures 3, 4:
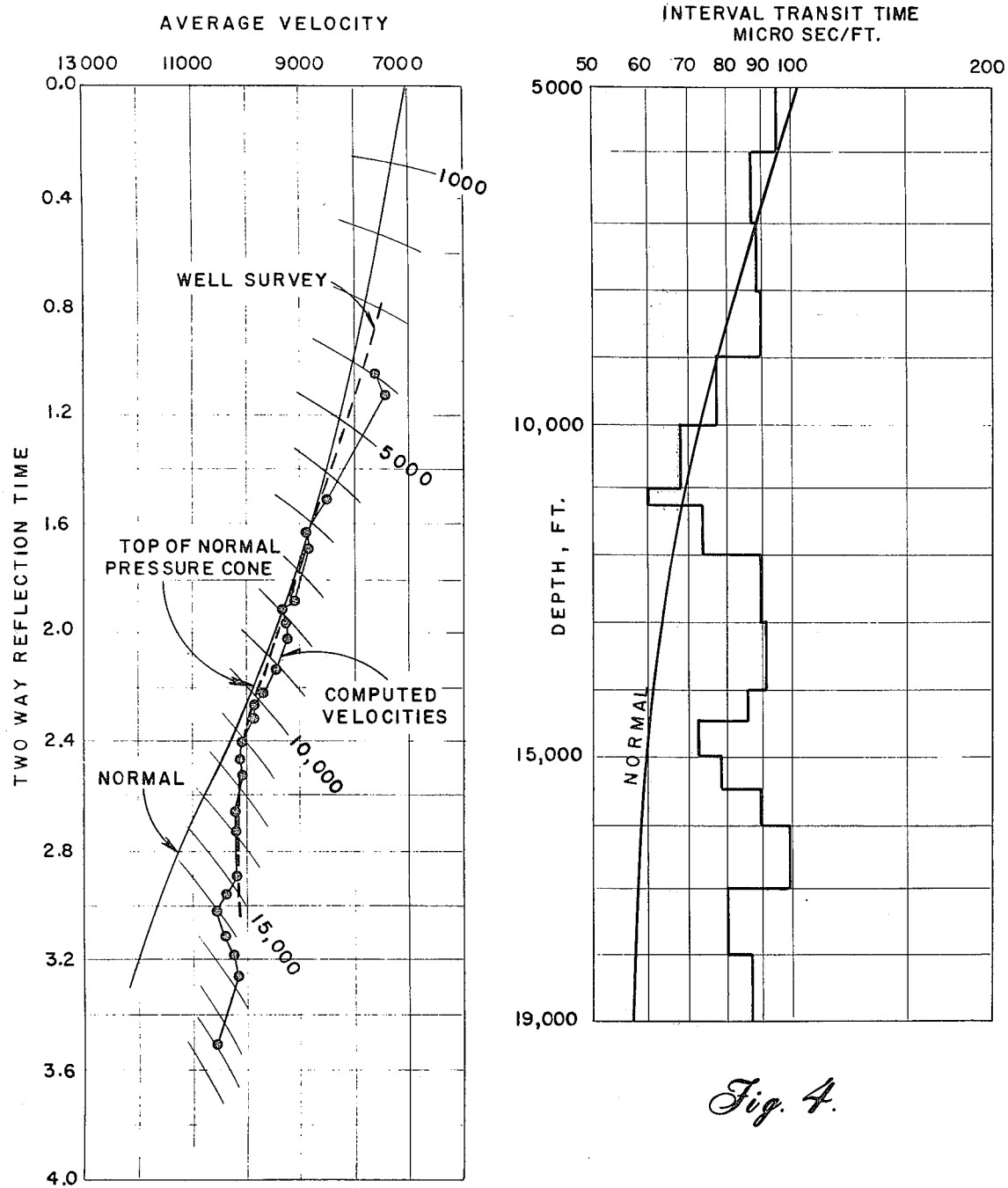
FIG. 3 is a coordinate plot of average velocity as a function of two-way reflection time computed from a seismic observation obtained near a surface location from which a borehole was subsequently drilled to penetrate both normal and abnormal pressurized earth formations. Shown also on this plot is the putatively normal trend of average velocity vs reflection time.
FIG. 4 is a coordinate plot of interval transit time as a function of depth in the earth.

With reference now to FIG. 1, there is illustrated a shot hole 3 drilled into the earth's subsurface from the earth's surface 1. On either side of the shot hole are disposed in a more or less linear array a plurality of seismic wave detectors, or geophones, designated by the reference numerals 12A through 12J. While only 10 geophones are illustrated as being disposed in a seismic wave detection array, it is obvious that a greater number, such as 12, 24, or 48, may be used, as is conventional. In addition, an uphole geophone 13 is positioned as near as possible to the shot hole 3. The leads from the various geophones are cabled together as illustrated by reference numeral 10 and are connected to a conventional analog or digital seismic recorder 9. A lead 7 from the recorder 9 is connected to an explosive charge 5 in the shot hole in the conventional manner for detonating the explosive charge. When the explosive charge is detonated, seismic waves produced by the charge will be propagated through the earth in substantially spherical wave fronts as is well known in the art, with the energy being refracted or reflected at earth formation interfaces such as the one designated by the reference numeral 23, and detected by the various geophones. The geophones will also detect seismic energy propagated directly thereto. Each of the signals produced by the various geophones is individually recorded by the seismic recorder, either in an analog or a digital format. The energy that is reflected from seismic wave reflecting interfaces or reflecting horizons will follow various ray paths. The ray paths designated by the reference numerals 15, 17, 19, and 21 illustrate the path followed by seismic energy reflected by reflecting horizon 23 and detected by geophones 12E, 12F, 12A, and 12J, respectively.

The seismic observation may be performed by other techniques using sources and geophone arrays other than those described immediately above without departing from the spirit and scope of the invention. For example, seismic impulses may be produced in sequence at time-spaced intervals at the various geophone locations indicated, and the seismic waves produced thereby may be individually recorded at the location of shot hole 3 by a geophone or pattern of geophones. In effect, the terminus locations of the reflected seismic waves will be reversed, but; in accordance with the well-known theory of reciprocity as applied to reflection seismology, the end effect of the observations will be the same.

If the seismic information is initially recorded on a magnetic recording medium, the information recorded by the recorder 9 may then be used to produce a visual seismogram. Although other types of presentation may be used, for convenience, such seismograms should be in a variable light transmissivity or reflectivity type of presentation, such as variable density, to facilitate interpretation.

The simplified seismogram illustrated in FIG. 2 will be assumed to be a variable density seismogram showing only lineups of seismic reflection events, which lineups are designated by the reference numerals 25A, 27A, 29A, and 31A. It will be assumed that the seismic information has been corrected to datum to remove the effects of variations in weathering layer thickness and variations in velocity of seismic wave propagation through the weathering layer. As is well known, the lineups of events will not be straight lines, but will exhibit curvature measured from the stable seismic wave terminus location, shown in FIG. 1 as shot hole 3. The events illustrated in FIG. 2 will be recognized as being produced from traces on one side of the shot hole, for convenience of explanation. The curvature of the lineups is produced by what is known as moveout, which has two components. One component is the result of angularity of travel path and the other is the result of variations in the average velocity of seismic wave propagation through the earth down to the seismic wave reflecting horizon producing the lineup of events. The amount of curvature produced by the angularity of travel path will decrease with increasing depth, while the amount of curvature produced by the variations in seismic wave velocity will increase with depth inasmuch as seismic wave velocity generally increases with increasing depth. The average velocity of seismic waves through the earth to a given reflecting horizon (producing the lineup of events 25B for example) may now be calculated from the formula $$\overline{V} = \frac{X}{\sqrt{t_x^2 - t_o^2}}$$

where $X$ is the distance from the shot hole to a given geophone in the array producing the lineup of events (usually the last geophone; i.e., geophone 12J in FIG. 1), $t_x$ is the corrected two-way travel time in seconds from the shot point to said given geophone of seismic waves reflected by the given reflecting horizon, and $t_o$ is the corrected two-way travel time in seconds from the shot point to a point on said reflection horizon directly beneath the shot point, and back to the earth's surface to the nearest geophone to the shot point (geophone 12E or 12F).

In a similar manner, the average velocities of seismic waves to reflecting horizons producing the other lineups of reflection events on the seismogram may be calculated. As many reflection events as possible are identified and an average velocity from datum is calculated for each of the lineups of reflection events.

The various velocities calculated as described above are now plotted as a function of travel time, or as a function of estimated depth. If there is available a log of seismic wave velocity as a function of depth for a borehole in the general area at which the seismic observation was performed that penetrates a sequence of earth formations that are known to be normally pressurized, the results of this log are plotted on the same or corresponding coordinates. Lacking such well control, a comparison may be made with a curve derived from the function $$\text{Log } V = \text{Log } V_0 + KD$$

where $V_0$ is seismic wave velocity at the datum plane, $D$ is depth in the earth measured from the datum plane, and $K$ is a constant between 0.000027 and 0.000031.

A convenient way to make such a comparison is to plot a family of curves on a transparent plastic plate for various seismic wave velocities at the datum plane, and to slide the plate over the upper portion of the plot of seismic velocity values derived as described above until as accurate a fit as possible is obtained. Where there is an abnormally pressurized earth formation present beneath the location of the seismic observation, there will be a point of deviation from the normal curve and the curve actually obtained, as illustrated in FIG. 3. The upper portions of the two curves will coincide fairly well, but, as illustrated in FIG. 3, at some reflection time (2.2 seconds) the actually derived velocity values will deviate from the normal curve in the direction of lower velocity. At a depth approximately corresponding to this reflection time one may expect to find the beginnings of the abnormally pressurized zone. Interval transit time may be computed as a function of depth, as shown in FIG. 4, to achieve the same results.

The amount of the deviation in interval transit time from the normal is indicative of the magnitude of abnormal pressure in the formation. The percent departure of subsurface interval transit times from the normal trend is roughly proportional to the formation fluid pressure gradient.

The drilling of a well may now commence following conventional techniques. When it is desired to more accurately determine the upper boundary of the overpressured earth formation in accordance with the invention, earth cuttings coming to the earth's surface are retrieved beginning at a depth of about 4,000 feet below the earth's surface, although such collection can begin under favorable conditions as close as 1,000 feet above the previously calculated depth at which it is reasonably believed that the overpressured earth formation will begin to be penetrated. The specific gravity of earth cuttings obtained from various depths is thereupon measured, and a plot is made from the measured values. Normally, the density of the cuttings should gradually increase with depth, but when fluids are trapped under high pressure in a formation, the formation exhibits higher than normal porosity and lower than normal density. Sharp deviations in density from the normal trend previously obtained will indicate that the overpressured formation has been penetrated and further drilling should be stopped when an undesirable formation pore pressure as determined from density measurements of the cuttings is reached. At this point, casing should be set and the mud in the borehole replaced with a mud of sufficient weight to control the pressure to be expected as drilling progresses. Manifestly, the reason for beginning the collection of earth formation cuttings a good distance above the high pressure formation is to permit the establishment of a "normal" density gradient.

In FIG. 5 there is illustrated a graph of density of earth cuttings as a function of depth that would be obtained when an overpressured earth formation is encountered. In the curve illustrated, the overpressured earth formation was encountered at a depth of about 10,800 feet, at which point the density of the cuttings decreased.

The density of earth cuttings can be measured using a number of types of apparatus known to the prior art. A very convenient type of apparatus utilizes a graduated glass cylinder containing two fluids of different densities, such as water and isopropyl alcohol, which are miscible and which form a linear density gradient. A number of calibrated balls of known density may be dropped into the graduated cylinder and will sink to various levels in the cylinder in accordance with their density. These values may be plotted on graph paper to obtain the exact density gradient of the cylinder. The earth cuttings, when dropped into the graduated cylinder, will sink in the liquid column to a depth which is an indication of their density. The density of the cuttings can then be determined by comparing the depth to which they sink with the value on the graph and deriving therefrom the density of the individual cuttings. It is necessary to periodically check the calibration of the graduated cylinder to make sure that temperature changes have not occurred that will affect the calibration thereof.

Although the embodiment of the invention disclosed in the preceding specification is preferred, modifications thereto will be apparent to those skilled in the art which do not depart from the scope of the broadest aspects of the present invention.

I claim:

1. A method for detecting abnormally pressured earth formations comprising:

performing a seismic observation at the earth's surface in which seismic waves are generated at the earth's surface and seismic energy resulting from said seismic waves so generated is detected at the earth's surface to obtain average seismic velocities through earth formations beneath the location of said seismic observation; and utilizing variations between the average seismic velocities in abnormally pressured formations and average seismic velocities in normally pressured formations to determine the depth of said abnormally pressured formations.

2. A method as recited in claim 1 in which the average seismic velocities in normally pressured formations are given by a relationship which increases exponentially with depth.

3. A method as recited in claim 1 including obtaining indications of the magnitude of the abnormal pressures from the amount of said average seismic velocity variations.

4. A method for detecting abnormally pressured earth formations comprising:

performing a seismic observation over an area of the earth's surface in which seismic waves are generated at the earth's surface and seismic energy resulting from said seismic waves so generated is detected at the earth's surface;

obtaining average seismic interval travel times through earth formations beneath said area of said earth's surface; and utilizing variations between the average seismic interval travel times in abnormally pressured formations and average seismic interval travel times in normally pressured formations to determine the depth of said abnormally pressured formations.

5. A method as recited in claim 4 in which the average seismic interval travel times in normally pressured formations are given by a relationship which decreases exponentially with depth.

6. The method of claim 4 wherein the seismic interval travel times in normally pressured formations are given by the relationship $$\mathrm{Log}_{10} V = \mathrm{Log}_{10} V_o + KD$$

where
$V_o$ is seismic wave velocity at datum depth,
$D$ is depth in the earth, and
$K$ is between 0.000027 and 0.000031.

7. A method as recited in claim 4 in which the amount of said interval travel time deviation indicates the magnitude of the abnormal pressure.

8. A method as recited in claim 4 including the steps of preparing an average seismic interval travel time curve as a function of depth for normally pressured formations and comparing said curve with said average seismic interval travel times in said earth formations beneath the location of said seismic observation plotted as a function of depth to determine the depth of said abnormally pressured formations.

9. A method for locating abnormally pressured earth formations comprising:
 conducting a seismic observation at the earth's surface in which seismic waves are generated at the earth's surface and seismic energy resulting from said seismic waves so generated is detected at the earth's surface to produce a seismogram indicative of average travel times of seismic waves through earth formations beneath the location of said observation;
 identifying lineups of events produced by reflected seismic waves on said seismogram;
 measuring the average velocity of reflected seismic waves which produce each of said lineups of events;
 recording the velocity thus measured as a function of depth of the reflecting horizons; and
 comparing said recording with a recording of normal seismic wave velocity through normally pressured formations as a function of depth to determine any deviation between the recordings indicative of abnormally pressured earth formations.

10. A method as recited in claim 9 in which the amount of deviation in velocities indicates the magnitude of the abnormal pressure.

11. A method for detecting abnormally pressured earth formations comprising:
 performing a seismic observation at the earth's surface in which seismic waves are generated at the earth's surface and seismic energy resulting from said seismic waves so generated is detected at the earth's surface to obtain average seismic velocities through earth formations beneath the location of said seismic observation at least to a particular depth, which earth formations include normally pressured and abnormally pressured formations;
 producing from said average seismic velocities a first curve representing average seismic interval travel times in said normally pressured and abnormally pressured formations versus depth;
 producing a second curve representing putatively normal average seismic interval travel times in normally pressured formations extending at least to said particular depth versus depth; and
 obtaining the deviations of said first curve from said second curve to establish the depths of said abnormally pressured formations.

12. A method as described in claim 11 including measuring the magnitudes of the abnormal pressures from the magnitudes of said obtained deviations.

* * * * *